(12) United States Patent
Omote et al.

(10) Patent No.: US 8,287,425 B2
(45) Date of Patent: Oct. 16, 2012

(54) VEHICULAR TRANSMISSION

(75) Inventors: Kenji Omote, Anjo (JP); Satoru Wakuta, Anjo (JP); Shinji Kawakami, Yokohama (JP); Masato Fujikawa, Toyota (JP); Masatoshi Adachi, Miyoshi-cho (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 1735 days.

(21) Appl. No.: 11/600,230

(22) Filed: Nov. 16, 2006

(65) Prior Publication Data

US 2007/0151546 A1    Jul. 5, 2007

(30) Foreign Application Priority Data

Nov. 17, 2005 (JP) ................................. 2005-333250

(51) Int. Cl.
*B60W 10/08* (2006.01)
(52) U.S. Cl. ............................................................ 477/3
(58) Field of Classification Search ........................ 477/3
See application file for complete search history.

(56) References Cited

U.S. PATENT DOCUMENTS

| | | | | |
|---|---|---|---|---|
| 5,801,499 A * | 9/1998 | Tsuzuki et al. | ................ | 318/141 |
| 6,244,295 B1 | 6/2001 | Bartussek et al. | | |
| 2005/0170929 A1 * | 8/2005 | Ito et al. | ............................. | 477/3 |
| 2006/0042700 A1 | 3/2006 | Yoshida et al. | | |
| 2007/0049442 A1 * | 3/2007 | Long et al. | ........................ | 475/5 |

FOREIGN PATENT DOCUMENTS

| | | |
|---|---|---|
| JP | U-64-113676 | 7/1989 |
| JP | U-04-77070 | 7/1992 |
| JP | A-06-185644 | 7/1994 |
| JP | 2001-041066 A | 2/2001 |
| JP | A-2001-504931 | 4/2001 |
| JP | A-2001-182814 | 7/2001 |
| JP | A-2001-280458 | 10/2001 |
| JP | 2003-240104 A | 8/2003 |
| JP | A-2005-212494 | 8/2005 |
| JP | A-2006-070976 | 3/2006 |
| RU | 2 020 242 C1 | 9/1994 |
| SU | 125148 | 6/1959 |

* cited by examiner

*Primary Examiner* — Edwin A Young
(74) *Attorney, Agent, or Firm* — Oliff & Berridge, PLC

(57) ABSTRACT

A vehicular transmission includes a gear-change mechanism section that shifts power from a driving source and outputs the power to an output shaft; and a hydraulic system that supplies hydraulic pressure from an oil pump to the gear-change mechanism section via a check valve. The check valve includes a cylindrical valve case in which a passage is formed, a valve stored within the valve case so as to be freely movable in an axial direction of the valve case, a valve seat that is formed at one end portion of the passage in the valve case and that closes the passage when the valve sits thereon, a spring for urging the valve so as to sit on the valve seat, and a spring seat fixed on an axially opposite side of the valve seat in the valve case to support the spring.

24 Claims, 4 Drawing Sheets

VEHICULAR TRANSMISSION

INCORPORATION BY REFERENCE

The disclosure of Japanese Patent Application No. 2005-333250 filed on Nov. 17, 2005 including the specification, drawings and abstract is incorporated herein by reference in its entirety.

BACKGROUND

The present invention relates to a vehicular power transmission.

A hybrid vehicle with an internal combustion engine and an electric motor as driving sources includes a hybrid power transmission. The hybrid power transmission requires a motor-operated pump driven by the electric motor and a mechanical pump driven by the driving sources in order to stop the driving sources (and thus stop the vehicle). When either one of the mechanical pump or the motor-operated pump operates and the other is stopped, it is necessary to interpose a check valve in a supplying passage that supplies hydraulic pressure from a hydraulic pump to a hydraulic system. The check valve prevents the hydraulic pressure from the operative pump from escaping from the side of the stopped pump, as disclosed in Japanese Patent Laid-open No. 2001-41066 (FIG. 5), for example.

Specifically, the check valve is mostly disposed within a valve body adjacent to a case for storing a gear-change mechanical section. The check valve is so disposed because the hydraulic pressure is supplied from the mechanical pump (disposed in the gear-change mechanical section) to the valve body, in which a regulator valve and the like is disposed in the supplying passage from the mechanical pump.

SUMMARY

While the check valve is arranged in general such that a ball of the check valve is stored in a hole formed in the valve body, the passage is closed when the ball is biased by a spring and sits on a valve seat. Fluid flows through the passage by moving the ball against the spring as the hydraulic pressure acts on the passage. Furthermore, there is a case when the fluid flown into the passage flows in a direction crossing to a direction in which the ball is movable. For example, when the valve seat is formed in the case that stores the gear-change mechanical section, the fluid from the mechanical pump flows within the valve body from the valve seat by passing the passage formed in the case, moves the ball by going against the spring and flows within the valve body so as to cross the ball. The ball also eccentrically hits against the valve seat because a clearance from the hole for storing the ball is large. As a result, a passage part (referred to as a guide part hereinafter), including the valve seat where the ball moves and slidably abuts eccentrically, becomes worn and is eventually damaged. As a result, the durability of the check valve drops and the pressure drops because of leaking fluid.

Specifically, because the supplying passage of the mechanical pump becomes a passage of main line pressure in running the vehicle when the gear-change mechanical section is operative, the above-mentioned problem of durability is soon realized because a large amount of fluid flows through the valve case. Then, there is a possibility that pressure loss becomes large and fuel consumption drops.

The invention thus provides, among other things, a vehicular transmission that solves the above-mentioned problems by using a check valve arranged such that a ball will not eccentrically hit against a guide part.

The invention according to a first exemplary aspect includes a vehicular transmission with a gear-change mechanism section that shifts power from a driving source and outputs the power to an output shaft; and a hydraulic system that supplies hydraulic pressure from an oil pump to the gear-change mechanism section via a check valve. The check valve includes a cylindrical valve case in which a passage is formed, a valve stored within the valve case so as to be freely movable in an axial direction of the valve case, a valve seat that is formed at one end portion of the passage in the valve case and that closes the passage when the valve sits thereon, a spring for urging the valve so as to sit on the valve seat, and a spring seat fixed on an axially opposite side of the valve seat in the valve case to support the spring, wherein the check valve is structured such that (1) fluid flows into the valve case from the valve seat, along the axial direction of the valve case and out of outflow ports and (2) such that a direction of flow of the fluid within the valve case almost coincides with a movable direction of the valve.

The invention according to a second exemplary aspect includes a check valve with a cylindrical valve case in which a passage is formed; a valve stored within the valve case so as to be freely movable in an axial direction of the valve case; a valve seat that is formed at one end portion of the passage in the valve case and that closes the passage when the valve sits thereon; a spring for urging the valve so as to sit on the valve seat; and a spring seat fixed on an axially opposite side of the valve seat in the valve case to support the spring, wherein the check valve is structured such that (1) fluid flows into the valve case from the valve seat, along the axial direction of the valve case and flows out of outflow ports and (2) such that a direction of flow of the fluid within the valve case almost coincides with the movable direction of the valve.

BRIEF DESCRIPTION OF THE DRAWINGS

Additional objects and advantages of the invention will be apparent from the following detailed description of a preferred embodiment thereof, which are best understood with reference to the accompanying drawings, wherein.

DETAILED DESCRIPTION OF EMBODIMENTS

Figure 1:
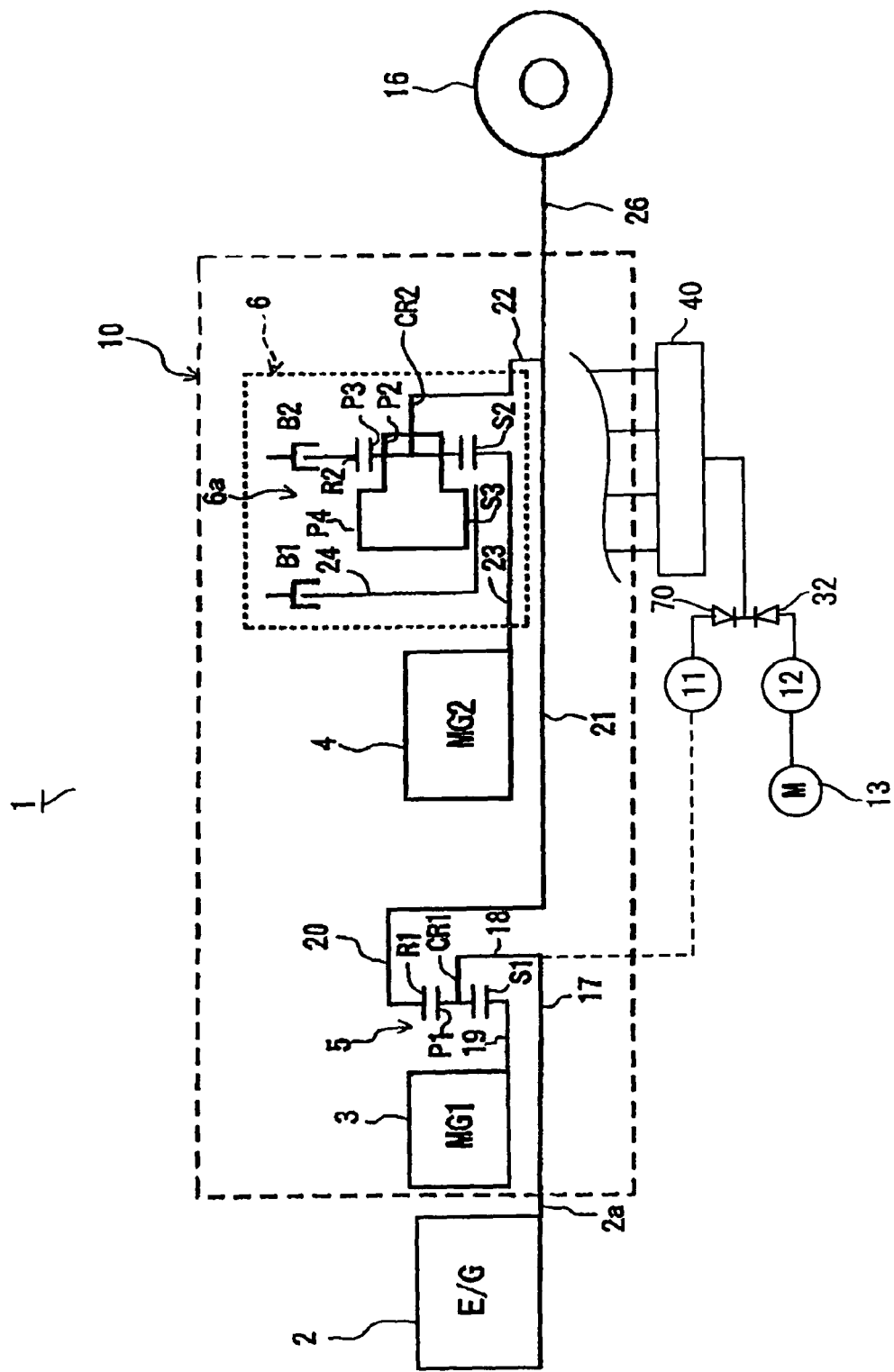
FIG. 1 is a schematic drawing of a driving system of a hybrid vehicle of the invention.
Figure 2:
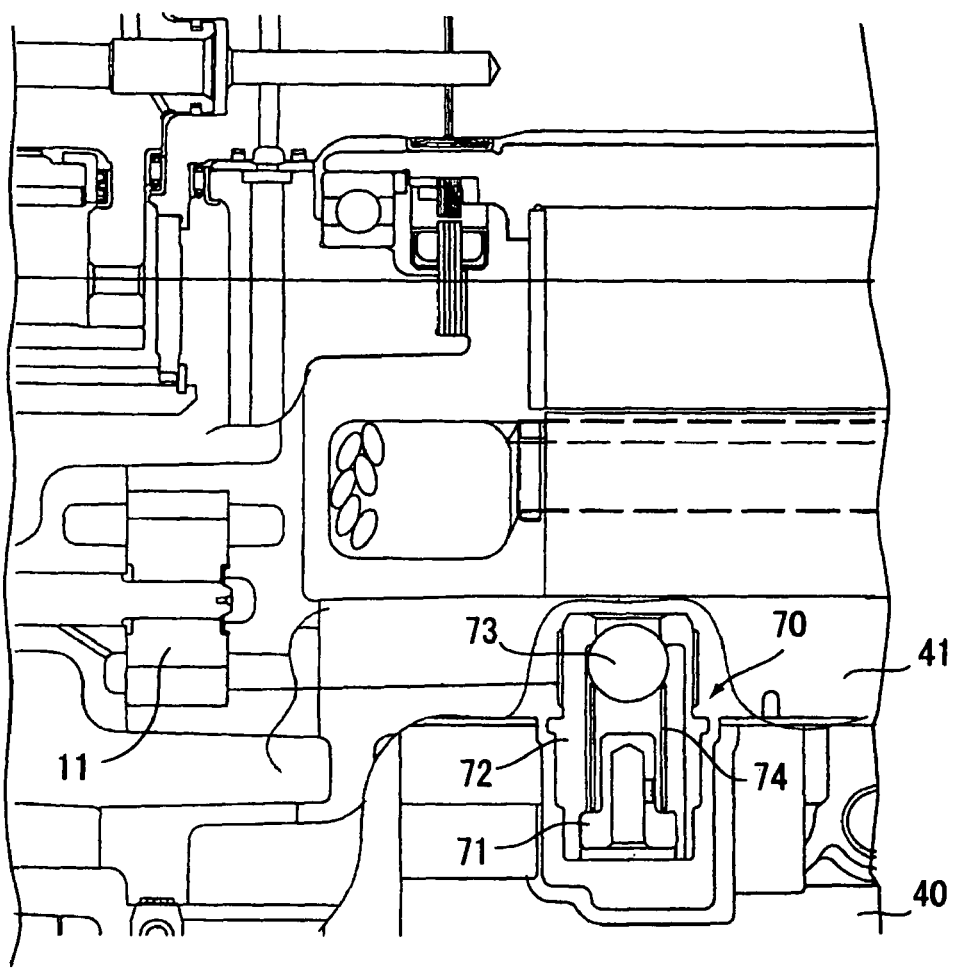
FIG. 2 is a drawing showing a section of a check valve by enlarging a part of a vehicular power transmission.
Figure 3:
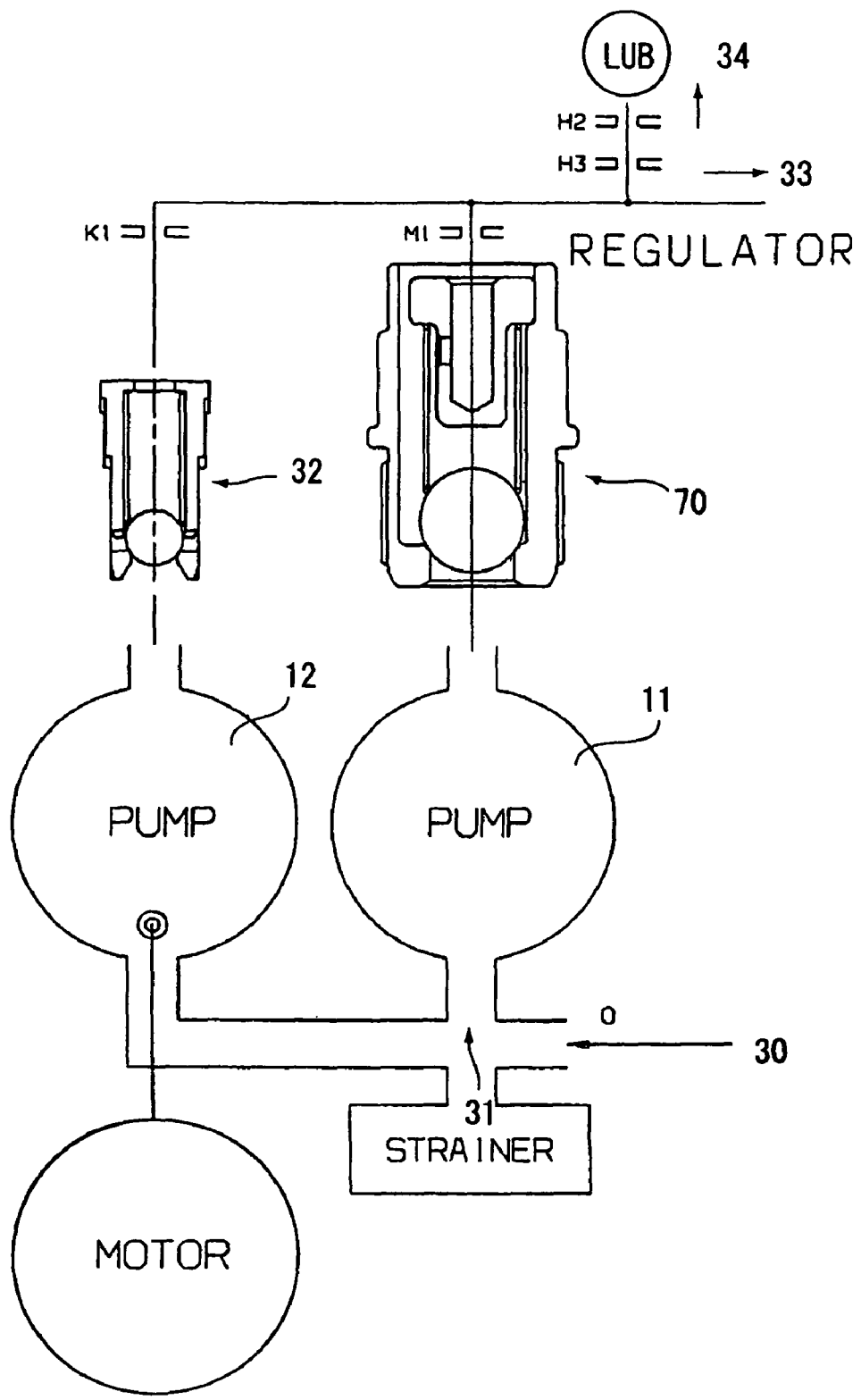
FIG. 3 shows an oil passage of the check valve of the embodiment.
Figure 4A:
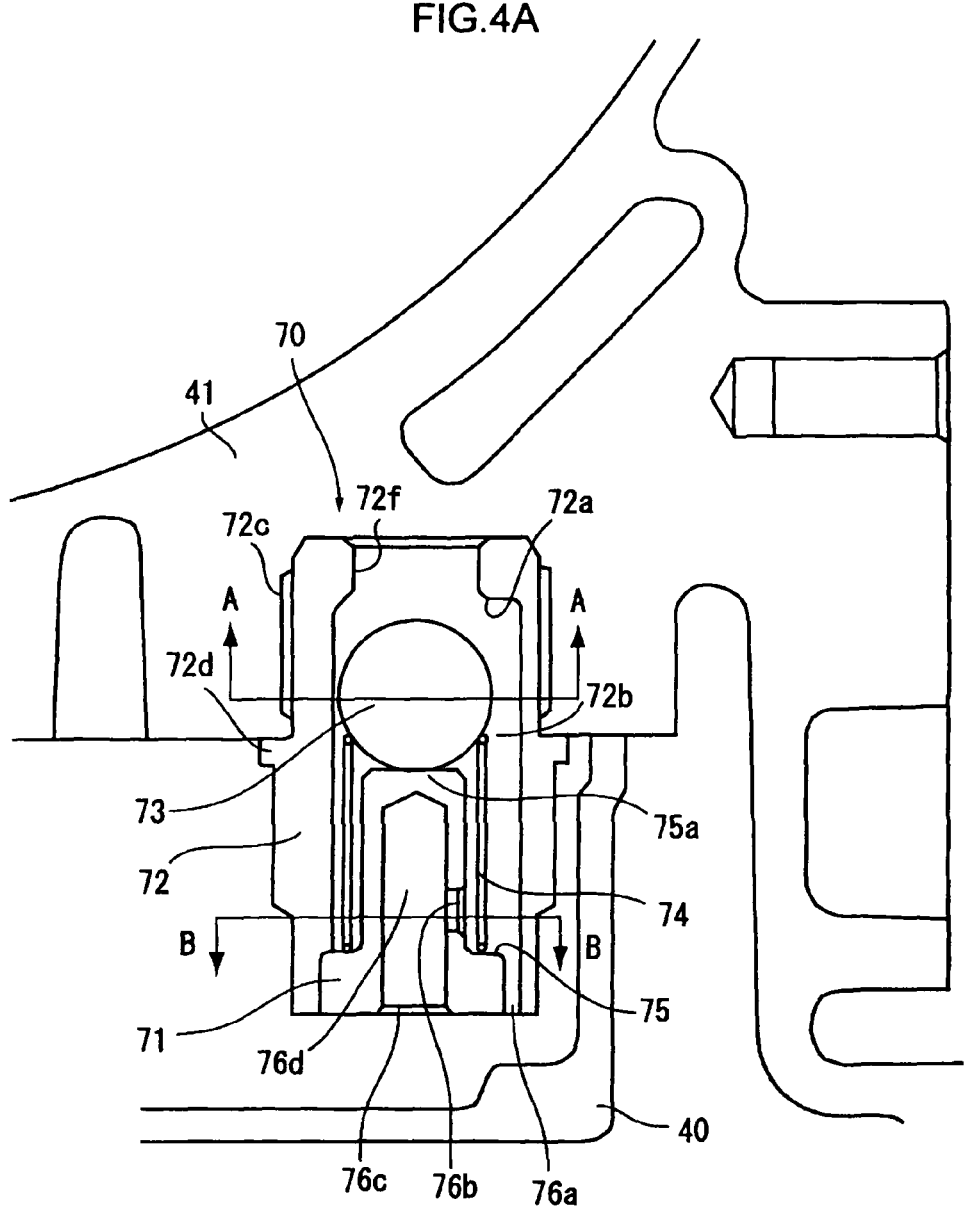
FIGS. 4A-4C are section views of the check valve.
Figure 4B:
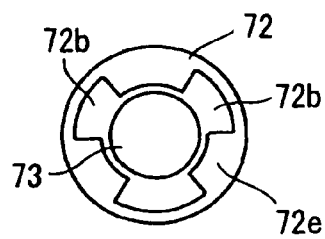
Figure 4C:
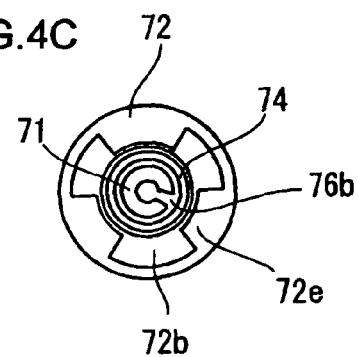

A mode for carrying out the invention will be explained with reference to FIGS. 1 through 4C. FIG. 1 is a schematic drawing of a driving system of a hybrid vehicle of the invention, FIG. 2 is a drawing showing a section of a check valve by enlarging a part of a vehicular power transmission, FIG. 3 shows an oil passage of the check valve of the embodiment and FIGS. 4A-4C are section views of the check valve, respectively.

A structure of a hybrid transmission to which the invention is applied will first be explained with reference to FIG. 1. In the hybrid power transmission 1, an input shaft 17 of a gear-change mechanical section 10 is connected to a crank shaft 2a of an engine 2 via a damper unit (not shown) and a carrier CR1 of a power distributing planetary gear 5. The power distribution planetary gear 5 is a simple planetary gear connected to the input shaft 17 via a hub member 18. The carrier CR1 has pinions P1 rotatably supported by side plates (not shown). A rotor shaft 19 of a first motor 3 is connected to a sun gear S1 that gears with the pinions P1. A ring gear R1 is also connected to the pinions P1 and the ring gear R1 is connected with a drum-like supporting member 20 and is connected to a transmission shaft 21 via the supporting member 20.

A stepped transmission 6 having a planetary gear unit 6a is connected to a rear end (right side in the figure) of the transmission shaft 21. Specifically, a carrier CR2 of the planetary gear unit 6a is connected to the transmission shaft 21 via a hub member 22. The carrier CR2 has long pinions P2 and P4 and a short pinion P3 (referred to simply as a pinion P3 hereinafter). The pinion P2 of a small diameter part and the pinion P4 of a large diameter part are formed in a body as the long pinion and the pinion P3 gears with the pinion P2 of the small diameter part.

The sun gear S2 gears with the pinion P3 and is connected with a rotor shaft 23 of a second motor 4. A sun gear S3 gears with the pinion P4 and is connected with a hub member 24. A friction plate of a first brake B1, that is a multi-plate brake, is engaged with the hub member 24 and the first brake B1 is freely anchored by line oil supplied from a regulator valve.

The pinion P3 gears with a ring gear R2 and a friction plate of a second brake B2, that is a multi-plate brake, is engaged with the ring gear R2. The second brake B2 is freely anchored by line oil supplied from the regulator valve.

Then, the transmission shaft 21 is connected to an output shaft 26 of the gear-change mechanical section 10. The output shaft 26 is linked with a differential unit via a coupling and a propeller shaft (not shown) and is further connected to driving wheels 16, rear wheels, via the differential unit and right and left driving shafts.

Hydraulic pressure is supplied to a valve body 40 having, for example, a regulator valve. A mechanical oil pump 11 is powered by the engine 2 in order to operate the gear-change mechanical section 10 or to lubricate each sliding section. The hybrid power transmission 1 is also provided with a motor-operated oil pump 12 that is driven independently of the mechanical oil pump 11. The motor-operated oil pump 12 is driven by an electric motor 13 to which electric power is supplied from an inverter for the motor-operated oil pump 12. When the engine 2 is idling or is stopped for example, the hybrid power transmission 1 that is linked with the engine 2 also stops. The motor-operated oil pump 12 is thus mainly driven when the hybrid power transmission 1 is in the stopped state to assure hydraulic pressure of a hydraulic control unit.

The mechanical oil pump 11 and the motor-operated oil pump 12 are connected in parallel with respect to the hydraulic control unit. As such, when the motor-operated oil pump 12 operates when the mechanical oil pump 11 is stopped, the hydraulic pressure generated by the motor-operated oil pump 12 flows backward to the mechanical oil pump 11 and hydraulic pressure necessary for the hydraulic control unit cannot be supplied. As a measure for this, a hydraulic check valve 70 prevents the hydraulic pressure from flowing backward to the mechanical oil pump 11.

Next, a structure of the check valve 70 (backflow preventing valve) of the invention will be explained. FIG. 2 shows a section of the check valve 70 by enlarging a part of the gear-change mechanical section 10. The check valve 70 is disposed in a valve body fixed at a lower part of a mission case 41 such that its axial line is almost coincident with a direction of gravity. Oil pressurized by the mechanical oil pump 11 is supplied to an upper part of the check valve 70 via an oil passage (not shown) within the mission case 41. The pressurized oil then presses down a ball 73 (which is a valve positioned at the upper part of the check valve 70 in the figure) while compressing a spring 74. Then, a gap is produced between a valve seat 72a of the valve case 72 and the ball 73, thus creating a passage where the oil flows (FIG. 4A).

Meanwhile, when pressure of the passage on the side of the mechanical pump is negative with respect to the hydraulic control unit, the oil flows into the check valve 70 from a lower part thereof in FIG. 2 and the ball 73 in the check valve 70 abuts against the valve seat 72a of the valve case 72 in linkage with the flow of the oil. Thus, it becomes possible to shut off the oil flow passage and to prevent the oil from flowing backward.

The flow passage of the oil will now be explained with reference to FIG. 3. The oil 30 flowing in from a return passage from a hydraulic circuit and the oil 31 suctioned from an oil pan through a strainer are lead to the mechanical oil pump 11 and the motor-operated oil pump 12 connected in parallel. The pumps 11 and 12 are arranged so that either one operates appropriately. For example, when the mechanical oil pump 11 stops and the motor-operated oil pump 12 operates due to idling, the motor-operated oil pump 12 pumps out the oil to the check valve 32 that is connected with an outflow port to supply oil to a regulator passage 33 and a lubricant passage 34, i.e., to a side of hydraulic load.

Meanwhile, because a short-circuit passage to the original oil flow-in passage via the check valve 70 and the stopped mechanical pump 11 is branched beside the supplying passages 33 and 34 to the load side in this oil flow circuit, the check valve 70 that plays the role of a one-way valve is interposed to prevent the oil from flowing into the short-circuit passage by shutting off the short-circuit of the hydraulic circuit.

Next, a mechanism of the check valve 70 will be explained. FIG. 4A is a section view of the check valve 70 in a direction of a side face thereof, FIG. 4B is a plan section view of the check valve 70 taken along an A-A line and FIG. 4C is a plan section view of the check valve 70 taken along a B-B line. The check valve 70 is composed of the cylindrical valve case 72 within which the passage is formed, the ball 73 disposed within the valve case 72 so as to be slidable in an axial direction, i.e., in a longitudinal direction of the valve case 72, the valve seat 72a that is formed at one end portion of the passage of the valve case 72 and that closes the passage when the ball 73 seats thereon, a spring 74 that urges the ball 73 so that it seats on the valve seat 72a and a spring seat 71 fixed on the axially opposite side from the valve seat 72a of the valve case 72.

The valve case 72 has a screw thread 72c formed around an outer periphery of an upper part thereof and is fixed by screwing the screw thread 72c into a female screw (not shown) formed at an opening of the oil passage. The lower part of the valve case 72 is inserted into an opening hole composing an oil passage for supplying hydraulic pressure of the valve body 40. It is noted that the opening of the oil passage for supplying hydraulic pressure of the mission case 41 is oil-tightly jointed with the oil passage for supplying hydraulic pressure of the valve body 40 and a flange 72d of the valve case 72 is oil-tightly jointed with the mission case 41. Then, in a state when the valve case 72 is thus mounted, the check valve 70 is disposed so that its axial direction, i.e., the longitudinal direction thereof, almost coincides with a direction of gravity. An inflow port 72f and the valve seat 72a against which the ball 73 abuts are formed at the upper part of the valve case 72 and an oil-tight state or a state in which the oil is allowed to pass is brought about depending on a movement of the ball 73.

Further, a plurality of (three for example) straight concave channels 72b are formed along the axial direction on an inner peripheral face of the valve case 72 from the lower part of the valve seat 72a to a terminal of the valve case 72. The concave channel 72b becomes a passage for guiding the oil flowing from the valve seat 72a to the terminal of the valve case 72. There is provided a supporting section 72e, formed to be concentric with the valve case 72 between the concave channels 72b, for slidably supporting the ball 73. These concave channels 72b and the supporting sections 72e form the passages and can also restrict the movement of the ball 73 so that it is freely movable only along a radial center of the valve case 72 in the axial direction. Therefore, the ball 73 can sit on the valve seat 72a while keeping an axial center of the ball 73 always concentric with an axial center of a seat face of the valve seat 72a. Still more, because the concave channel 72b becomes the passage, it is advantageous from an aspect of reducing loss resistance to be straight and to have a large sectional area, it is desirable to provide many concave channels 72b or to provide the concave channel 72b having a large sectional area. Meanwhile, from the necessity that the supporting section 72e restricts the movement of the ball 73 in the radial direction within the valve case 72, it is required to abut against the peripheral face of the ball 73 by contact points of at least three or more. There is a mutual relationship between the area of the concave channel 72b and a number of the supporting section 72e and it must be appropriately selected from the oil passing loss resistance and mobility of the ball 73.

Next, while the ball 73 (which is an example of a valve) is preferably a globular ball from the necessity of bringing about the oil-tight state by sliding within the valve case 72 and by abutting against the valve seat 72a, it is also possible to adopt a round column whose face of abutment is a plane face, a circular cone whose face of abutment is a slope or a disk-like plain plate as long as it is possible to form the oil-tight state. However, it is desirable to adopt the shape of the ball in order to reduce loss resistance without hampering a streamline along which the oil flows. Still more, the ball 73 is urged toward the valve seat 72a by the spring 74 supported by the spring seat 71 and the ball 73 abuts against the valve seat 72a in a normal state. The ball 73 slides and forms the passage only when force in a direction going against the urging force of the spring 74 is applied.

One end portion of the spring 74 abuts against a spring seat 75 provided in the spring seat 71 and is disposed so as to cover an outer periphery of a stopper section 75a and is supported so as to be movable in the compressing direction of the spring 74. Meanwhile, the other end of the spring 74 abuts against the ball 73 and the ball 73 is capable of moving in the vertical direction along with the movement of the spring 74. Because the urging force of the spring 74 is determined by a diameter of the spring wire and a number of windings, the wire diameter and the number of windings are determined so that the spring 74 can exhibit the least urging force that enables the ball 73 to abut against the valve seat 72a.

Next, the spring seat 71 is inserted into the valve case 72 from the lower end of the valve case 72 together with the ball 73 and the spring 74, and engages in a body with the supporting sections 72e that form the inner periphery of the valve case 72 such that the engagement will not be disengaged even if hydraulic pressure acting within the valve case 72 is applied. The spring seat 75 has a pedestal and is smaller than the outer diameter of the spring seat 71 and the columnar stopper section 75a that extends from the spring seat 75. The spring seat 75 is the face against which the spring 74 abuts as described above and the stopper section 75a has an apex for restricting the vertical movement of the ball 73 at the upper end thereof. Thereby, the ball 73 is restricted to move only between the valve seat 72a and the apex of the stopper section 75a to prevent the ball 73 from largely sliding within the valve case 72. It is noted that a range of an inner wall face of the valve case 72, where the ball 73 restricted by the stopper section 75a slidably contacts the valve seat 72a, is a guide part where eccentric abrasion may occur. Still more, the stopper section 75a has a perforated hole 76d that penetrates through the spring seat 71 to the vicinity of the apex of the stopper section 75a as a passage described later. The stopper section 75a also has a through hole 76b formed to guide the oil passed through the concave channel 72b of the valve case 72 to the through hole 76b by the side portion thereof.

The oil flown into the valve case 72 via the inflow port 72f and through the gap between the valve seat 72a and the ball 73 partially passes through the concave channel 72b of the valve case 72 and flows out of the valve case 72 from the outflow port 76a that corresponds to the lower end of the concave channel 72b. A part thereof is guided to the perforated hole 76d via a through hole 76b provided in the stopper section 75a and is flown out of the valve case 72 from the perforated hole 76d via the through hole 76b provided in the stopper section 75a. Thereby, a straight oil passage may be formed, there are two oil outflow passages of outflow ports 76a and 76c, the oil flown into the valve case 72 is guided to the outside without causing loss and loss of pressure otherwise caused in the check valve 70 may be suppressed to the minimum.

It is noted that although the check valve interposed in the supplying fluid passage from the mechanical pump has been explained in the embodiment, the invention is also applicable to the check valve interposed in the supplying fluid passage from the motor-operated pump. Still more, although the invention has been applied to the hybrid transmission as a vehicular transmission, the invention is not limited to that and is applicable to other vehicular transmissions such as an automatic transmission in the same manner.

According to an exemplary aspect of the invention, the check valve in which the valve is stored in the valve case formed in a body with the valve seat is used, so that the movement of the valve is restricted in the axial direction of the valve case and the flow of the fluid almost coincides with the movable direction of the valve. Accordingly, the valve will not eccentrically hit against a guide part including the valve seat (referred to typically as a valve seat) and it becomes possible to prevent eccentric abrasion of the valve seat otherwise caused by the eccentric hitting and to prolong the life of the check valve.

According to an exemplary aspect of the invention, the ball is used as the valve and the stopper section restricts a movable range of the ball. Therefore, the movable direction of the ball almost coincides with the direction of gravity, no load otherwise caused by the gravity will not act on the ball and it becomes possible to prevent the ball from eccentrically hitting against the valve seat more steadily while keeping smooth the movement of the valve (ball) within the valve case.

According to an exemplary aspect of the invention, the check valve is applied to the supplying oil passage from the mechanical pump that is a main oil passage of the transmission for hybrid vehicles, so that it is possible to solve the problems concerning the durability of the check valve, to prevent pressure loss from increasing and to keep high performance of fuel consumption for a long period of time.

According to an exemplary aspect of the invention, the check valve is fixed to the case of the gear-change mechanical section and is disposed between the valve body such that the longitudinal direction of the check valve conforms to the vertical direction, so that it becomes possible to prevent the eccentric abrasion of the valve from occurring that is otherwise caused by the eccentric hitting against the valve seat.

According to an exemplary aspect of the invention, the concave channels formed on the inner peripheral face of the valve case become the passages and the ball can move along the axial line accurately while contacting with the inner peripheral face of the valve case, so that it is possible to steadily prevent the eccentric abrasion from occurring that is otherwise caused by the eccentric hitting against the valve seat.

According to an exemplary aspect of the invention, there are the plurality of concave channels and outflow ports, so that it is possible to smoothen the flow of the fluid in the check valve and to prevent pressure loss from increasing.

According to an exemplary aspect of the invention, the outflow port is the opening continuous to the concave channel, so that the flow of the fluid in the check valve is smooth. Still more, the holes are made through the stopper section as outflow ports, and the flow of the fluid thus becomes smoother.

According to an exemplary aspect of the invention, the check valve is separately made from the valve body and is fixed to the case for storing the automatic gear-change mechanical section, so that it is possible to prevent an oil amount within the valve case from being unbalanced in assembling the valve body to the case.

What is claimed is:
1. A vehicular transmission, comprising:
a gear-change mechanism section that shifts power from a driving source and outputs the power to an output shaft; and
a hydraulic system that supplies hydraulic pressure from an oil pump to the gear-change mechanism section via a check valve, wherein the check valve comprises:
a cylindrical valve case in which a passage is formed,
a valve stored within the valve case so as to be freely movable in an axial direction of the valve case,
a valve seat that is formed at one end portion of the passage in the valve case and that closes the passage when the valve sits thereon,
a spring for urging the valve so as to sit on the valve seat, and
a spring seat fixed on an axially opposite side of the valve seat in the valve case to support the spring, wherein
the check valve is structured such that (1) fluid flows into the valve case from the valve seat, along the axial direction of the valve case and out of outflow ports and (2) such that a direction of flow of the fluid within the valve case almost coincides with a movable direction of the valve.
2. The vehicular transmission as set forth in claim 1, wherein:
the spring seat is positioned on an inner diametric side of the spring and has a stopper section for restricting a movement of the valve; and
the valve case is disposed such that the axial direction almost coincides with a direction of gravity.
3. The vehicular transmission as set forth in claim 2, wherein:
the vehicular transmission is a transmission for a hybrid vehicle that has an internal combustion engine and electric motors as the driving source;
hydraulic pumps for supplying the hydraulic pressure to the hydraulic system are a mechanical oil pump driven by the internal combustion engine and a motor-operated oil pump driven by the electric motors; and
the check valve is interposed in a supplying oil passage for supplying the hydraulic pressure from the mechanical oil pump.
4. The vehicular transmission as set forth in claim 3, wherein:
the hydraulic system has a valve body containing a plurality of valves and oil passages;
the valve body is disposed at a lower part of a mission case for storing the gear-change mechanical section; and
the valve case is fixed to the mission case and the check valve is disposed between the mission case and the valve body such that a longitudinal direction conforms to a vertical direction.
5. The vehicular transmission as set forth in claim 4, wherein:
a concave channel that becomes a passage of the fluid is formed along the axial direction on an inner peripheral face of the valve case; and
the valve is movable while contacting with the inner peripheral face of the valve case.
6. The vehicular transmission as set forth in claim 3, wherein:
a concave channel that becomes a passage of the fluid is formed along the axial direction on an inner peripheral face of the valve case; and
the valve is movable while contacting with the inner peripheral face of the valve case.
7. The vehicular transmission as set forth in claim 2, wherein;
the hydraulic system has a valve body containing a plurality of valves and oil passages;
the valve body is disposed at a lower part of a mission case for storing the gear-change mechanical section; and
the valve case is fixed to the mission case and the check valve is disposed between the mission case and the valve body such that a longitudinal direction conforms to a vertical direction.
8. The vehicular transmission as set forth in claim 7, wherein:
a concave channel that becomes a passage of the fluid is formed along the axial direction on an inner peripheral face of the valve case; and
the valve is movable while contacting with the inner peripheral face of the valve case.
9. The vehicular transmission as set forth in claim 2, wherein:
a concave channel that becomes a passage of the fluid is formed along the axial direction on an inner peripheral face of the valve case; and
the valve is movable while contacting with the inner peripheral face of the valve case.
10. The vehicular transmission as set forth in claim 1, wherein:
the vehicular transmission is a transmission for a hybrid vehicle that has an internal combustion engine and electric motors as the driving source;
hydraulic pumps for supplying the hydraulic pressure to the hydraulic system are a mechanical oil pump driven by the internal combustion engine and a motor-operated oil pump driven by the electric motors; and
the check valve is interposed in a supplying oil passage for supplying the hydraulic pressure from the mechanical oil pump.
11. The vehicular transmission as set forth in claim 10, wherein:
the hydraulic system has a valve body containing a plurality of valves and oil passages;

the valve body is disposed at a lower part of a mission case for storing the gear-change mechanical section; and the valve case is fixed to the mission case and the check valve is disposed between the mission case and the valve body such that a longitudinal direction conforms to a vertical direction.

12. The vehicular transmission as set forth in claim 11, wherein:

a concave channel that becomes a passage of the fluid is formed along the axial direction on an inner peripheral face of the valve case; and the valve is movable while contacting with the inner peripheral face of the valve case.

13. The vehicular transmission as set forth in claim 10, wherein:

a concave channel that becomes a passage of the fluid is formed along the axial direction on an inner peripheral face of the valve case; and the valve is movable while contacting with the inner peripheral face of the valve case.

14. The vehicular transmission as set forth in claim 1, wherein:

the hydraulic system has a valve body containing a plurality of valves and oil passages;

the valve body is disposed at a lower part of a mission case for storing the gear-change mechanical section; and the valve case is fixed to the mission case and the check valve is disposed between the mission case and the valve body such that a longitudinal direction conforms to a vertical direction.

15. The vehicular transmission as set forth in claim 14, wherein:

a concave channel that becomes a passage of the fluid is formed along the axial direction on an inner peripheral face of the valve case; and the valve is movable while contacting with the inner peripheral face of the valve case.

16. The vehicular transmission as set forth in claim 1, wherein:

a concave channel that becomes a passage of the fluid is formed along the axial direction on an inner peripheral face of the valve case; and the valve is movable while contacting with the inner peripheral face of the valve case.

17. The vehicular transmission as set forth in claim 16, the check valve further comprising a plurality of concave channels and a plurality of outflow ports.

18. The vehicular transmission as set forth in claim 17, wherein:

the outflow ports are composed of an opening formed between the valve case and the spring seat and a hole formed within the stopper section.

19. The vehicular transmission as set forth in claim 1, further comprising:

a case for storing the gear-change mechanism section; wherein:

the hydraulic system has a valve body for storing a plurality of valves and oil passages; and the check valve is separately made from the valve body and the valve case is fixed to a mission case for storing the gear-change mechanism section.

20. A check valve, comprising:

a cylindrical valve case in which a passage is formed;

a valve stored within the valve case so as to be freely movable in an axial direction of the valve case;

a valve seat that is formed at one end portion of the passage in the valve case and that closes the passage when the valve sits thereon;

a spring for urging the valve so as to sit on the valve seat; and a spring seat fixed on an axially opposite side of the valve seat in the valve case to support the spring, wherein the check valve is structured such that (1) fluid flows into the valve case from the valve seat, along the axial direction of the valve case and flows out of outflow ports and (2) such that a direction of flow of the fluid within the valve case almost coincides with the movable direction of the valve.

21. The check valve as set forth in claim 20, wherein:

the spring seat is positioned on an inner diametric side of the spring and has a stopper section for restricting a movement of the valve; and the valve case is disposed such that the axial direction almost coincides with a direction of gravity.

22. The check valve as set forth in claim 20, wherein:

a concave channel that becomes a passage of the fluid is formed along the axial direction on an inner peripheral face of the valve case; and the valve is movable while contacting with the inner peripheral face of the valve case.

23. The check valve as set forth in claim 20, the check valve further comprising a plurality of concave channels and a plurality of outflow ports.

24. The check valve as set forth in claim 23, wherein:

the outflow ports are composed of an opening formed between the valve case and the spring seat and a hole formed within the stopper section.

* * * * *